Feb. 20, 1945.    G. A. F. WINCKLER    2,369,931
BATTERY CONSTRUCTION
Filed Oct. 20, 1941

Inventor
Gunnar A. F. Winckler
By Watson, Cole, Grindle & Watson
Attorney

Patented Feb. 20, 1945

2,369,931

UNITED STATES PATENT OFFICE 2,369,931

BATTERY CONSTRUCTION

Gunnar A. F. Winckler, Elkton, Md., assignor to Winckler Engineering Laboratories, Inc., Boston, Mass., a corporation of Massachusetts Application October 20, 1941, Serial No. 415,797

6 Claims. (Cl. 136—113)

This invention relates to primary batteries of the so-called dry cell or Leclanche type and provides improvements in such batteries which, in addition to giving them non-deteriorating characteristics throughout their shelf life, provides additional energy-generating characteristics when they are actually put into use.

It is a general object of the present invention to provide a novel and improved dry battery of the non-deteriorating type.

More particularly it is an object of the invention to provide improvements in non-deteriorating or deferred-action types of dry batteries enabling them to provide the same or a greater quantity of electrical energy than batteries of the type whose useful life begins immediately upon their manufacture.

Another important object of the invention consists in the provision of a non-deteriorating type of dry battery in which the electrolyte is stored in a breakable vial, portions of which cooperate with the metal anode cup of the battery to support the cathode and depolarizing material in a relatively immovable position within the cup both before and after the breaking of the container to release the electrolyte to activate the battery.

An important feature of the invention comprises the shaping of the electrolyte cup or vial to make the most efficient use of the space within the anode cup whereby a larger capacity may be given to the battery than has heretofore been possible in batteries of this general type.

A further important feature of the invention resides in the use, in a battery of the stored electrolyte type, of means comprising a closure for the electrolyte vial for preventing the collapse of the bobbin, or inward movement of the carbon electrode when subject to longitudinal pressure exerted for the purpose of providing good electrical contact between superimposed batteries and stationary contacts.

Other and further features and objects of the invention will be more apparent to those skilled in the art upon a consideration of the accompanying drawing and following specification wherein are disclosed preferred embodiments of the invention with the understanding that such changes and modifications may be made therein as fall within the scope of the appended claims without departing from the spirit of the invention.

It has heretofore been proposed to provide dry cells of the so-called Leclanche type in which all of the electrolyte, in the form of a liquid or paste, has been initially maintained separate from the other elements of the battery, until it has been desired to place the same into operation when the electrolyte is released to saturate the chemicals arranged between the anode cup and the cathode rod.

Such batteries have not generally been found satisfactory for use, however, where they are held between spring-pressed contacts engaging the base of the anode cup and the tip of the cathode rod for the purpose of making electrical contact therewith, because of the previous difficulties in supporting the bobbin against collapse into the space originally occupied by the container for the electrolyte. For flashlight use, the conditions are aggravated because of the rough handling tending to disintegrate the bobbin material which is normally held together as a result of compression on assembly.

In accordance with the present invention, however, use is made of a novel type of electrolyte vial or container to provide mechanical support for the bobbin and the cathode rod, both prior and subsequent to the breaking of the container for release of the electrolyte.

Figure 1:
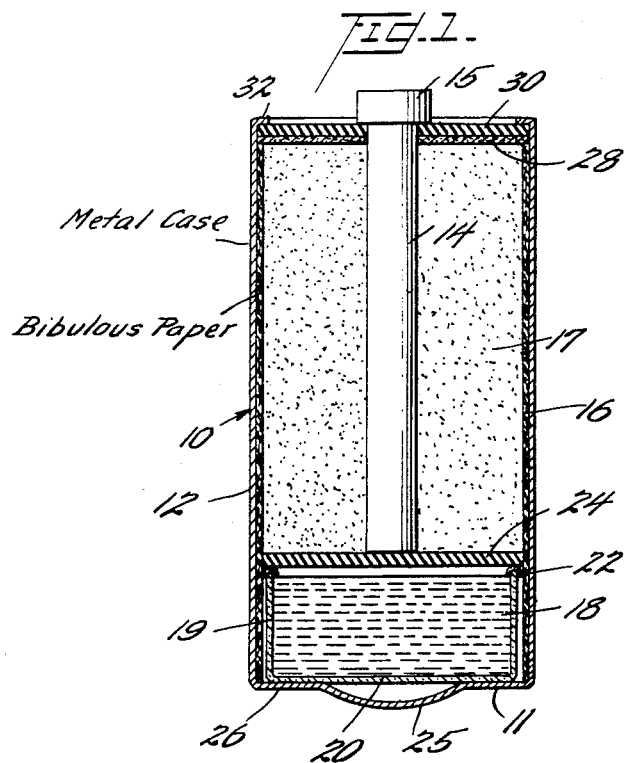
Figure 1 is a longitudinal central section through battery constructed in accordance with the present invention.

Referring now to the drawing and particularly to Figure 1 for a better understanding of the invention, it will be seen that in general the battery comprises conventional parts such as the anode cup 10 which is conventionally formed of zinc in one piece including a bottom 11 and side walls 12. The central cathode rod 14 is usually formed of carbon and for the sake of improved contact conductivity is capped with an inverted brass cup 15 extending outside of the finally assembled cell. The cell cup is lined with a paper-like material 16 extending substantially throughout the length of its side walls 12 to separate the closely packed granular material 17 from the anode. This granular material may consist entirely of a depolarizing agent such, for instance, as manganese dioxide or a suitable mixture of the depolarizing agent with powdered carbon augmented by other known ingredients, if desired, to provide certain valuable characteristics.

Under any conditions, however, for the sake of convenience in assembly and to provide a compact cell, the material 17 is compressed into a cake about the carbon rod, the whole being referred to in the art and hereinafter as a "bobbin." Preferably the flat lower end of the bobbin extends at right angles to the axis of the rod and is flush with the bottom end thereof as shown. The bobbin is of such a length that when the cathode cap 15 extends above the seal, which will be later described, the bottom of the bobbin is well spaced above the bottom of the cathode cup to provide space for the stored electrolyte 18 which is a thin liquid adapted to saturate the chemicals of the battery when its container is disrupted. For the purposes of this explanation, it may be considered as a saturated solution of sal ammoniac which, chemically, is ammonium chloride.

The electrolyte is contained in a cup or vial 19 of some frangible material, preferably a vitreous container, of which ordinary glass has proven satisfactory. In order that the container may provide for the maximum volume of liquid with the minimum use of space within the cathode cup, it is preferably of a cylindrical configuration having a substantially flat bottom 20 and cylindrical side walls adapted to fit relatively closely within the paper liner 16. Such a cup is shown in Figure 2 which illustrates a slight modification wherein the bottom 20' is of thinner material than the side walls 21 to facilitate breaking of the bottom in a manner to subsequently be described, while ensuring additional strength to the side wall.

Figure 2:
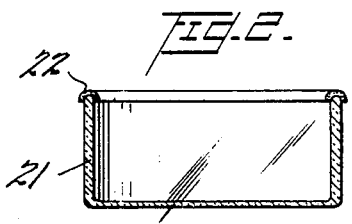
Figure 2 is a longitudinal central section through an electrolyte cup or vial prior to assembly in the battery and showing a slight modification of the same.

In the process of manufacture the glass vial is inverted so that what is normally the upper edge thereof is dipped into a molten plastic adhesive composition which then adheres to the edges as shown at 22 in Figure 2. The cup is then placed in its upright position and filled with the appropriate quantity of electrolyte in a conventional filling machine, after which a closure or cover disc 24 is applied by merely pressing the same against the adhesive material 22 which instantly sticks to it and causes a close adherence of the disc to the vial. This seals up the vial against any leakage of the electrolyte irrespective of the position in which the battery may be placed. The disc 24 is preferably a punching of plastic composition of some rigidity as, for instance, Bakelite or the like, and serves not only as the closure for the vial but provides a rigid and permanent support for the bobbin and its central rod, ensuring against the collapse of the battery under pressure, rough treatment or the like, both before the vial is broken and subsequently.

Figure 3:
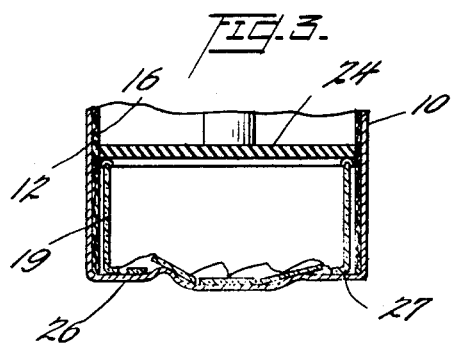
Figure 3 is a fragmentary view of the lower portion of a battery of the type shown in Figure 1 after the vial has been broken to release the electrolyte and activate the battery.

Preferably for the convenience of the user, the bottom wall of the cathode cup is provided with a central projection or blister 25 leaving a peripheral annulus 26 against which the rim of the bottom wall of the electrolyte cup rests. If this blister is struck sharply against a hard surface, the bottom of the cup is sufficiently deformed to break the relatively fragile bottom wall of the electrolyte container as illustrated in Figure 3. This permits the electrolyte, which is a very thin liquid, to run out of the cup and it is instantly absorbed by the lining paper 16 which is of a bibulous character especially selected for its rapidity of absorption. This paper acts as a wick immediately carrying away the electrolyte from the bottom of the container and distributing it along the walls of the zinc cup where it is rapidly absorbed by the porous material 17 putting the battery into almost instant activity. In fact, the operation is so rapid that instantly upon breaking the electrolyte vial, substantially full potential can be detected between the electrodes of the battery.

Because of the shape of the electrolyte vial, even though it may not have the heavier side walls as illustrated in Figure 2, for the most part the cylindrical side walls remain intact and sufficient of them engages the bottom of the cup as shown, for instance, at 27 to support the insulating disc 24 in its initial position, ensuring against any sagging of the material 17 into the space previously occupied by the electrolyte and firmly resisting any movement of the electrode rod 14 downwardly under the action of the contact spring pressure to which the battery is normally subjected.

In assembling the battery the electrode cup is formed with straight side walls, the lining paper comprising one full turn and a slight amount of overlap is introduced, the electrode cup filled and sealed, as previously explained, is dropped into position, and the preformed bobbin placed in the cup over the same. Following this a plastic sealing composition 28 is poured into place, which seals between the metal cup and the carbon rod to provide a gas-tight and evaporation-proof cell. Any of the well-known sealing compositions used in batteries may be availed of here. To further enhance the sealing and to improve the appearance and strength of the battery, a washer of molded plastic 30 is applied over the sealing composition. This may be of light-colored Bakelite or the like of sufficient diameter to provide a close fit with the inner walls of the zinc cup and having an opening closely fitting the outer walls of the carbon rod. The projecting edges of the zinc cup are now spun over as shown at 32 to hold this disc in position and complete the locking together of all of the battery parts. The contact cup 15 is finally pressed into position on the carbon rod which finishes the assembling of the battery except for the tubular pasteboard jacket, not shown, usually provided to protect the side walls of the container so as to ensure against short-circuit in the battery.

It has been found as a result of tests extending over long periods that a battery of the type described will provide on an average about 20% more potential power at the time that it is put into operation than does the conventional type of dry cell even after only a very short shelf life averaging not more than one or two weeks. The added available power is explained not only by the shelf loss of the conventional cell but by the inability of the manufacturers thereof to incorporate an adequate quantity of moisture in the cell at the time of manufacture and at the same time provide sufficient gas space as a reservoir to prevent disruption of the seal when it is suddenly put on a high discharge.

The battery of the present invention loses none of its potential energy during any length of shelf life because it is entirely dry and there is no chemical reaction whatsoever taking place. Immediately upon releasing the electrolyte, however, the cell is capable of providing full power. A large quantity of liquid may be stored in the cylindrically shaped container and as soon as it is released and absorbed, vacates a large gas reservoir at the bottom of the cell. It will be appreciated that the cell is capable of operation when in any position and can be put into action, inverted or in its normal position because of the extent of the bibulous lining into the bottom of the container. It will further be appreciated that a slight excess quantity of liquid may be provided to take care of any which may be lost by slight leakages due to incomplete sealing thereby providing a longer useful current delivery.

The provision of a gas reservoir in the cell is extremely important for it prevents disruption of the seal on sudden evolution of gas when the battery is subject to high discharge, but when the cell is temporarily not in operation, excess gas accumulation leaks out through the pores of the carbon rod or through any minor leaks which may occur in the seal.

In the usual type of cell the depolarizing agent does not extend to the zinc cup liner but is surrounded by a relatively thick layer of a paste-like material containing flour or some similar substance, the purpose of which is to hold in a pasty form a reserve of electrolyte which provides for the extended operation of the cell. This material being entirely absent in applicant's construction, provides space for more depolarizing agent than can be provided in the conventional cell with a consequent longer and more active life. The internal resistance of the cell is likewise lower than that of the conventional type because of this closer proximity of the depolarizing agent to the zinc electrode, and the battery can therefore be used in a more run-down condition than can the older types of batteries with their higher internal resistance which seriously reduces the output potential available.

Having thus described the invention, what is claimed as new and desired to be secured by Letters Patent is:

1. In a dry cell of the non-deteriorating type, in combination, a zinc cup, a lining of bibulous material for the side walls of the cup, a bobbin comprising a carbon rod and a dry depolarizing mass substantially filling all but the lower portion of the cup, a frangible vial extending substantially between the cup bottom and said bobbin, a thin electrolyte in said vial adapted to be released by the breaking thereof, a non-frangible disc forming the upper closure for said vial and engaging the under-surface of the bobbin and carbon rod to support the same, said vial having substantially cylindrical side walls and a flat bottom, said bottom engaging the bottom of the zinc cup and arranged to be broken when the cup bottom is deflected inwardly, the side walls being adapted to remain sufficiently intact to support said disc from the cup bottom.

2. In a dry cell of the non-deteriorating type, in combination, a metal anode cup, a bibulous lining for the walls of such cup a bobbin including a cathode rod and assembled depolarizer adapted to closely fit the said lining and to fill all but the bottom portion of the cup, a rigid insulating disc adapted to support the bobbin spaced from the cup bottom, an electrolyte vial supporting said disc, said vial having substantially cylindrical side walls to closely fit said cup, and a flat bottom of frangible material adapted to be broken upon deforming the bottom of the anode cup.

3. In a dry cell of the non-deteriorating type, in combination, a metal anode cup, a bibulous lining for the walls of such cup a bobbin including a cathode rod and assembled depolarizer adapted to closely fit the said lining and to fill all but the bottom portion of the cup, a rigid insulating disc adapted to support the bobbin spaced from the cup bottom, an electrolyte vial supporting said disc, said vial having substantially cylindrical side walls to closely fit said cup, and a flat bottom of frangible material adapted to be broken upon deforming the bottom of the anode cup, said disc being sealed to the upper edge of said walls to form a fluid-tight closure for the vial.

4. In a dry cell of the type described, in combination, a zinc cup, a bibulous lining for the side walls thereof, a frangible cup engaging a substantial area of the bottom of the zinc cup and the lower portion of the lining, a non-frangible cover sealed to the upper edges of the frangible cup, electrolyte in said sealed cup, a bobbin including a central carbon rod and coaxial depolarizing mass substantially filling the remainder of the zinc cup, and means sealing the zinc cup above said mass and between the rod and cup walls.

5. In a dry cell of the non-deteriorating type, in combination, a cylindrical zinc cup having a closed bottom, a bibulous lining for the walls of said cup, a cup of frangible material in the bottom of said zinc cup and having short cylindrical walls coaxial with and close to those thereof, a rigid disc closing the top of said second cup, electrolyte in said second cup, a bobbin resting on said disc and sealed in said first cup, the bottom of said second cup being of thin material and the bottoms of said cups being so formed and related that deformation of the zinc one will break the other without serious damage to the cylindrical walls thereof.

6. In a dry cell of the non-deteriorating type, in combination, a cylindrical zinc cup having a closed bottom, a cup of frangible material in the bottom of said zinc cup and having short cylindrical walls coaxial with and close to those thereof, a rigid disc closing the top of said second cup, electrolyte in said second cup, and a bobbin resting on said disc and sealed in said first cup, the bottom of said frangible cup being substantially flat and engaging the flat peripheral annulus of the zinc cup bottom, the central portion of the zinc bottom being bulged outwardly to form a striking blister.

GUNNAR A. F. WINCKLER.